US012563005B1

(12) United States Patent (10) Patent No.: US 12,563,005 B1
Shaw et al. (45) Date of Patent: Feb. 24, 2026

(54) SYSTEM AND METHOD FOR ENHANCED GENERATION OF CONTROLLED RULES-BASED CONDITIONAL ELECTRONIC COMMUNICATION

(71) Applicant: Veeva Systems Inc., Pleasanton, CA (US)

(72) Inventors: Stephanie Y. Shaw, Seattle, WA (US); Arno Sosna, Pleasanton, CA (US); Nishant Bafna, Fremont, CA (US); Sean Menne, Raleigh, NC (US); Krista McBrearty, Livermore, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/649,209

(22) Filed: Apr. 29, 2024

Related U.S. Application Data

(60) Provisional application No. 63/499,074, filed on Apr. 28, 2023.

(51) Int. Cl.
| | |
|---|---|
| *H04L 51/063* | (2022.01) |
| *G06F 40/186* | (2020.01) |
| *H04L 51/066* | (2022.01) |

(52) U.S. Cl.
CPC .......... *H04L 51/063* (2013.01); *G06F 40/186* (2020.01); *H04L 51/066* (2013.01)

(58) Field of Classification Search
CPC ... H04L 51/063; H04L 51/066; G06F 40/186; G06Q 10/107
See application file for complete search history.

(56) References Cited

U.S. PATENT DOCUMENTS

| | | | |
|---|---|---|---|
| 6,167,435 | A | 12/2000 | Druckenmiller et al. |
| 6,295,058 | B1 | 9/2001 | Hsu et al. |
| 6,360,221 | B1 | 3/2002 | Gough et al. |

(Continued)

FOREIGN PATENT DOCUMENTS

| | | |
|---|---|---|
| JP | 2004513460 A | 4/2004 |
| JP | 2010211830 A | 9/2010 |

(Continued)

OTHER PUBLICATIONS

U.S. Appl. No. 60/261,712, filed Jan. 12, 2001 entitled Method and System for Creating Presentation Packages.

(Continued)

*Primary Examiner* — Johnny B Aguiar

(57) ABSTRACT

The approved email generation system described is capable of producing email communications between users and customers by using approved email templates and content that have been aligned with customer information regarding access to such content. Additional electronic communication builder rules conditionally provide access to a set of fields for personalization as well various aligned content. Once the approved email has been generated, the content may be verified again for accuracy and validity before being delivered to the customer. When the customer accesses delivered content, the approved email generation system again verifies the content and allows the customer access to only the most current version of the content available. The system provides for control of the content of electronic communications to customers.

19 Claims, 7 Drawing Sheets

(56) References Cited

U.S. PATENT DOCUMENTS

| | | | |
|---|---|---|---|
| 6,438,584 B1 | 8/2002 | Powers | |
| 6,449,634 B1 | 9/2002 | Capiel | |
| 6,650,890 B1 | 11/2003 | Irlam et al. | |
| 6,775,689 B1 | 8/2004 | Raghunandan | |
| 6,789,108 B1 | 9/2004 | McMillan | |
| 6,978,417 B1 | 12/2005 | Kohn et al. | |
| 7,065,555 B2 | 6/2006 | Foulger et al. | |
| 7,149,964 B1 | 12/2006 | Cottrille et al. | |
| 7,155,436 B2 | 12/2006 | Hegde et al. | |
| 7,333,956 B2 | 2/2008 | Malcolm | |
| 7,363,384 B2 | 4/2008 | Chatani et al. | |
| 7,523,167 B2 | 4/2009 | Thomas et al. | |
| 7,584,251 B2 | 9/2009 | Brown et al. | |
| 7,634,556 B2 | 12/2009 | Huynh et al. | |
| 7,707,317 B2 | 4/2010 | Huynh et al. | |
| 7,730,165 B2 | 6/2010 | Shapiro | |
| 7,865,394 B1 | 1/2011 | Calloway et al. | |
| 7,904,922 B1 | 3/2011 | Haberman et al. | |
| 7,966,374 B2 | 6/2011 | Huynh et al. | |
| 8,171,077 B2 | 5/2012 | Huynh et al. | |
| 8,296,378 B2 | 10/2012 | Huynh et al. | |
| 9,055,023 B2 | 6/2015 | Murphy et al. | |
| 2001/0031454 A1 | 10/2001 | Mintz | |
| 2001/0052019 A1 | 12/2001 | Walters et al. | |
| 2001/0054059 A1 | 12/2001 | Marks et al. | |
| 2002/0019849 A1 | 2/2002 | Tuvey et al. | |
| 2002/0169670 A1 | 11/2002 | Barsade et al. | |
| 2004/0093429 A1 | 5/2004 | Burton et al. | |
| 2007/0073699 A1* | 3/2007 | Reed | G06F 21/604 |
| | | | 707/999.009 |
| 2008/0155025 A1* | 6/2008 | Xu | G06Q 10/10 |
| | | | 709/206 |
| 2008/0243724 A1 | 10/2008 | Voorhees | |
| 2008/0320568 A1 | 12/2008 | Hawkins et al. | |
| 2009/0240521 A1 | 9/2009 | Simons et al. | |
| 2009/0254449 A1 | 10/2009 | Kuno | |
| 2011/0213658 A1 | 9/2011 | Joa et al. | |
| 2012/0221663 A1* | 8/2012 | Liebenberg | H04L 51/00 |
| | | | 709/206 |
| 2013/0138487 A1 | 5/2013 | Crasmaru et al. | |
| 2013/0232550 A1 | 9/2013 | Kihara et al. | |
| 2013/0294322 A1 | 11/2013 | Yun et al. | |
| 2014/0208391 A1* | 7/2014 | Farnsworth | H04L 51/063 |
| | | | 726/4 |
| 2018/0157764 A1* | 6/2018 | Longo | G06F 16/951 |

FOREIGN PATENT DOCUMENTS

| | | |
|---|---|---|
| JP | 4980636 B2 | 7/2012 |
| KR | 20080111175 A | 12/2008 |
| KR | 20120076490 A | 7/2012 |
| WO | 0030009 A2 | 5/2000 |
| WO | 0065762 A2 | 11/2000 |
| WO | 0193509 A1 | 12/2001 |

OTHER PUBLICATIONS

U.S. Appl. No. 60/326,776, filed Oct. 3, 2001 entitled Methods and Apparatus for a Dynamic Messaging Engine.

U.S. Appl. No. 60/393,176 by Huynh et al., filed Jul. 1, 2002 entitled "Adaptive Rich Media Messaging"; incorporated herein by reference.

U.S. Appl. No. 60/633,832, filed Dec. 6, 2004, 25 pages.

WO-PCT/US2014/036990 International search report of the international searching authority for co-pending PCT application mailed Sep. 24, 2014.

* cited by examiner

600

SYSTEM AND METHOD FOR ENHANCED GENERATION OF CONTROLLED RULES-BASED CONDITIONAL ELECTRONIC COMMUNICATION

CROSS-REFERENCE TO RELATED APPLICATIONS

The present application is a continuation application of U.S. Provisional Patent Application No. 63/499,074, filed on Apr. 28, 2023, entitled System and Method for Enhanced Generation of Controlled Rules-Based Conditional Electronic Communication, and U.S. Pat. No. 9,055,023, entitled System and Method for Controlling Electronic Communications, which are hereby incorporated by reference herein for all purposes.

TECHNICAL FIELD

The present disclosure relates generally to systems and methods that provide for optimized sending of approved content to electronic communications recipients, including methods and systems for building the approved content and generating the approved messages for electronic communications such as email.

BACKGROUND

In certain fields, the ability to achieve efficiencies associated with modern electronic communications such as email has been hampered by the risks (regulatory and otherwise) of sending such electronic communications. An example of one field that has been so limited has been the pharmaceutical sales industry, where sales reps typically are restricted from sending email communications to prescribing doctors because of the enormous risks that can flow from unapproved, uncontrolled messages. For example, careless rep or other personnel might send an email to a subscribing doctor suggesting off-label uses for a drug. This could end up exposing the user's employer (e.g., a pharmaceutical company) to regulatory penalties or other legal liabilities.

SUMMARY OF THE INVENTION

Embodiments disclosed in the present document provide a system and machine-implemented method for optimized generating and sending of enhanced rules-based conditional approved emails. The computer-implemented method comprising: establishing an electronic message template, wherein the electronic message template includes at least a set of customized fields for electronic message personalization, a first item of approved content within a controlled content repository and a second item of approved content within the controlled content repository; establishing an access protocol for the controlled content repository, whereby approved content is stored in the controlled content repository and is accessible according to the access protocol, and whereby the access protocol comprises at least one set of alignment rules for determining if the first item of approved content within the controlled content repository and the second item of approved content within the controlled content repository can be made available to a first customer via an electronic message; establishing at least one set of electronic message builder conditional rules, whereby the first item of approved content within the controlled content repository, the second item of approved content within the controlled content repository, and the set of customized fields for electronic message personalization are dependent on each other and conditionally available to the first customer via the electronic message template; aligning the approved content within the controlled content repository with information from an information management system; providing the first item of approved content within the controlled content repository for selection by a sender after a determination that the first item of approved content within the controlled content repository is authorized to be made available to the first customer in accordance with the at least one set of alignment rules, and the at least one set of electronic message builder conditional rules; providing the second item of approved content within the controlled content repository for selection by the sender after a determination that the second item of approved content within the controlled content repository is authorized to be made available to the first customer in accordance with the at least one set of alignment rules, and the at least one set of electronic message builder conditional rules; and enabling generation of an electronic message for sending the provided first item of approved content within the controlled content repository and the provided second item of approved content within the controlled content repository to the first customer.

BRIEF DESCRIPTION OF THE DRAWINGS

For a more complete understanding of the present application and its advantages, references are now made to the following description taken in conjunction with the accompanying drawings, in which like reference numbers indicate like features.

Although similar reference numbers may be used to refer to similar elements for convenience, it can be appreciated that each of the various example embodiments may be considered to be distinct variations.

Figure 1:
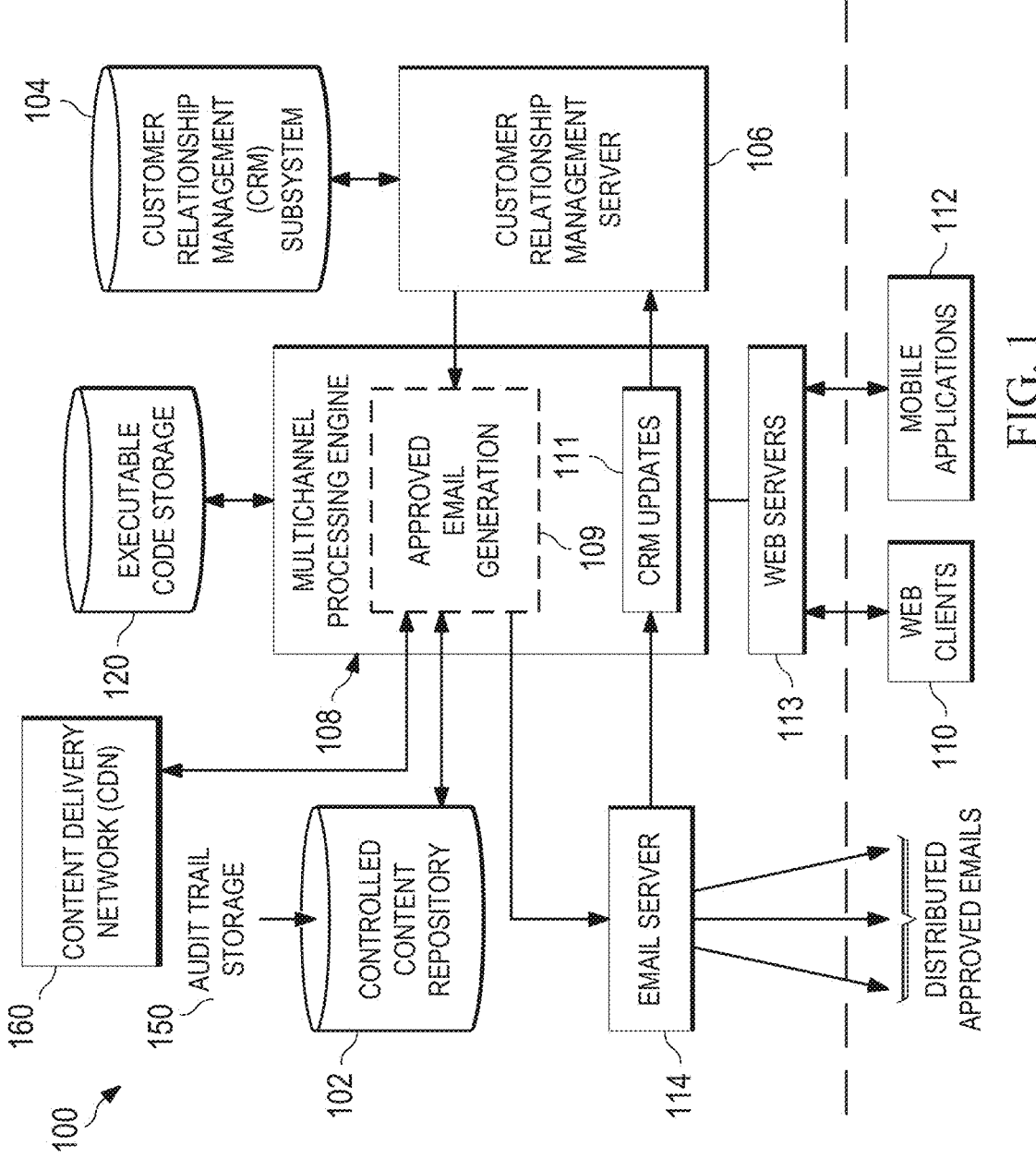
FIG. 1 illustrates an exemplary architecture for managing the building and sending of enhanced rules-based conditional approved electronic communications.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The use of custom personalized electronic communications is far more effective for users (e.g., pharmaceutical representatives) to develop and maintain their relationships with recipients (e.g., health care providers or HCPs). Users are typically provided the option of free text spaces to include individualized content for a unique touch. However, unconstrained messages should be minimized to reduce the risk of accidentally sending costly uncontrolled, unapproved messages. There is a need for a system that allows the user more flexibility to customize the electronic communication without the risk of using unrestricted free text. Embodiments disclosed in the present application enable users to build an electronic communication using approved blocks of text and attachments with predefined rules applied to them to enforce dependencies.

Embodiments disclosed in the present application allow for control of email content for communications between system users (e.g., sales reps, or pharmaceutical reps) and email recipients (e.g., health care providers, or HCPs) by providing for a system and method for generating enhanced rules-based conditional approved email communication. Users (e.g., sales reps, or pharmaceutical reps) may access a list of email templates which have been pre-generated with approved content and then aligned with various customer attributes such as regulatory limitations, customer preferences and demographic information in order to ensure compliant and tailored communication between the user and the recipient.

Such controlled email or other electronic communication generation occurs at an interface between a repository of approved content items and templates along with customer relationship management (CRM) information including customer profile information and parameters including customer preferences and regulatory limitations or fields that can be used to facilitate compliance with regulatory limitations. The system is capable of generating warning notices to users when content and customer access do not align, and users may choose various actions to address the warning notices such as excluding certain customers from the communication or changing email content. The customer information is from a customer relationship management subsystem.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments. After tailored approved emails are constructed by the customer and/or user, the content contained within the tailored approved email may be once again checked for accuracy and validity by the system before release to the email server. When a recipient accesses content within a tailored approved email, the recipient is directed to a customer portal through which the content is accessed. The recipient may be only allowed access to the most current version of the approved content within the content repository. In this manner, the content received and viewable by the recipient has been verified in real-time as being compliant, approved content.

FIG. 1 is a system overview illustrating an embodiment of a controlled email communication system 100. The presently disclosed embodiment comprises a controlled content repository 102, a Customer Relationship Management (CRM) server 106, and a multichannel processing engine 108. The customer relationship management server 106 may provide access to a customer relationship management subsystem 104, and the multichannel processing engine 108 may be coupled to an email server 114. In one embodiment, the customer relationship management subsystem 104 and/or the email server 114 may be operated by a third party. The multichannel processing engine 108 may be accessed by users such as company sales representatives through web clients 110 or through mobile apps 112 (such as iOS™, linux-based operating system for mobile devices (Android™), Blackberry™, or Windows™ Mobile systems), communicating with the multichannel processing engine 108 through web servers 113. Although the users may be described in the present application as being company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, sales representatives, etc. The content generated in the controlled content repository 102 may be accessed on a regulated basis and used to generate approved electronic communications. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail, tracking exact content of communications as they were sent by the user (e.g., pharmaceutical rep), as well as metadata about the communications and information regarding the content accessed by recipients (e.g., HCP).

The customer relationship management subsystem 104 contains all professional information of HCPs that may be available to users, including contact information, licensing information, areas of practice, and specialties. In addition, the customer relationship management subsystem 104 may also be capable of storing configurations regarding specific preferences, regulatory limitations and requirements, and other fields that will facilitate the generation of appropriate approved electronic communications, in general or on a by recipient basis. These preferences and/or requirements include both the preferences of the user (e.g., maintaining account lists) as well as the preferences of the enterprise (e.g., employers of the users), discussed in further detail below. In some examples, the approved content and email templates may be pre-processed and stored in the controlled content repository 102 and provided to the multichannel processing engine 108 during the process for generating a tailored approved email. In other examples, the customer relationship management subsystem 104 may have a content management subsystem and may provide the approved content and the templates.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date. The customer relationship management subsystem 104 may also be used to determine the type of domain an email communication is delivered through. A recipient in Spain may receive an email from "Companyx.es, whereas a recipient in Germany would receive the same email from "Companyx.ge." This may allow for additional branding options for the company controlling and sending the electronic communications.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers (e.g., pharmaceutical companies campaign manager) and/or users (e.g., pharmaceutical reps) to have access to coordinated and frequently updated CRM data and to use that coordinated data for sending approved electronic communications in accordance with the system described herein. In an embodiment, the multichannel processing engine 108 is responsible for combining the customer account information from the customer relationship management subsystem 104 with content available from the controlled content repository 102. Within the customer relationship management subsystem 104, customer accounts may be assigned a set of alignment rules which determine specific pieces of content that are available for use from the controlled content repository 102. The multichannel processing engine 108 may apply these rules and supply the user with a list of approved tailored email templates and pieces of content that may then be used to construct a tailored approved email communication. Tailored approved email generation occurs within the multichannel processing engine 108 according to executable code computer instructions stored in executable code storage 120. The executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multi-channel processing engine 108 through either a Web Client 110 or through the mobile apps 112 (such as iOS™, linux-based operating system for mobile devices (Android™), Blackberry™, or Windows™ Mobile systems).

In one implementation, the content in the controlled content repository 102 may be published to the Content Delivery Network ("CDN") so that the content can be served faster. The content delivery network (CDN) subsystem 160 is a distributed network to share content. Thus, instead of accessing the content from the controlled content repository 102 which may be at a remote location, the user computing devices may get the content from the CDN, as a global cache. Content may be uploaded and retrieved based on geographical nodes. Both zipped and unzipped versions are available.

Figure 2:
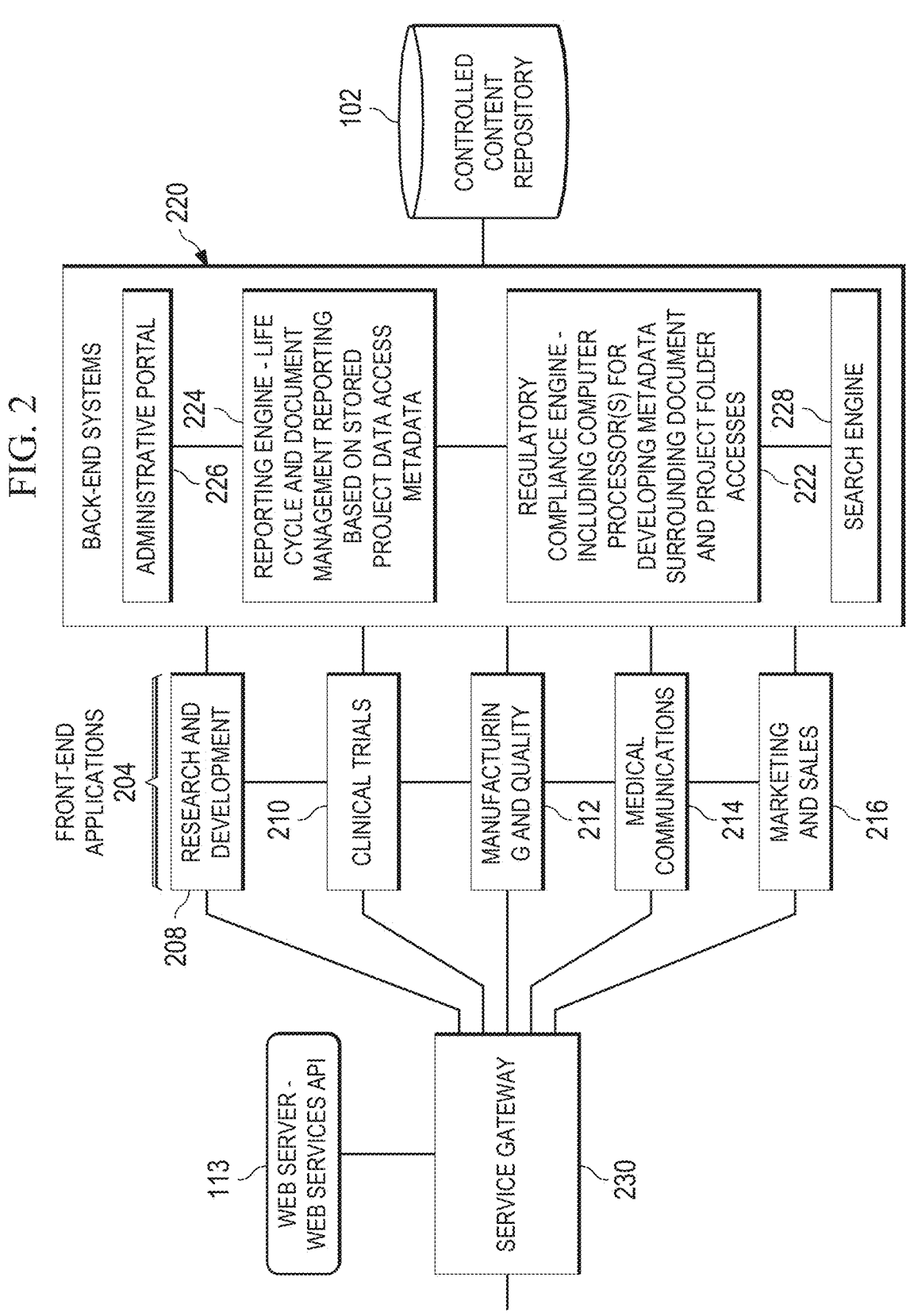
FIG. 2 illustrates an example architecture for the content repository of FIG. 1 in which content is built and organized in a controlled manner that facilitates efficient content generation.

FIG. 2 provides a description of the controlled content repository 102 with additional specific applications and interfaces connected thereto. In an embodiment, this controlled content repository 102 is a cloud-based or distributed network-based system for consolidating an enterprise's data, often times integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204: The Research & Development (R&D) front end application 208 provides for an aggregation of materials in support of research and initial clinical trial submissions through building organized and controlled content repositories within the controlled content repository 102. Elements that can be stored, organized, and managed through this frontend include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROS, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process. The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

In one implementation, the multiprocessing engine 108 dynamically generates the decoupled personalized copy of the template 600. One example may include, personalizing documents containing healthcare economics or formulary information specific to the health care provider or health care organization (HCO).

In one implementation, the personalized copy of the template 600 with the CRM token values placed may be stored in the content delivery network subsystem 160. The personalized copy may then be shared with the recipient as a web link via Approved Email, short message service (SMS), messaging app, quick response (QR) code, or copied and pasted into any communication method.

In further disclosed embodiments, the back-end systems 220 may contain a reporting engine 224 that reports on documents, their properties and the complete audit trail of changes. These simple-to-navigate reports show end users and management how content moves through its life cycle overtime, enabling the ability to track plan versus actual and identify process bottlenecks. The reporting engine may include processors for developing and reporting life cycle and document management reporting based on Stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching. In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the controlled email communication system 100 such that particular features are usable within the various user screens. For example, and without limitation to any other possible combination of features, in the below-described description of generating a tailored approved electronic communication, the above-described search portal can be used to search for approved attachments (i.e. content) within the controlled content repository 102 which may be then attached to one of the tailored template emails being prepared for sending to a recipient. And the synergy of combining these particular systems is that the generation of the controlled content can be done in a controlled fashion such that the approved content can be sent to recipients with greater confidence in the integrity of the data being sent.

In one implementation, the tailored email template may be generated by the approved email generation controller 109, as described in U.S. Pat. No. 9,055,023, entitled System and Method for Controlling Electronic Communications and issued on Jun. 9, 2015, which is hereby incorporated by reference herein for all purposes.

Figure 3:
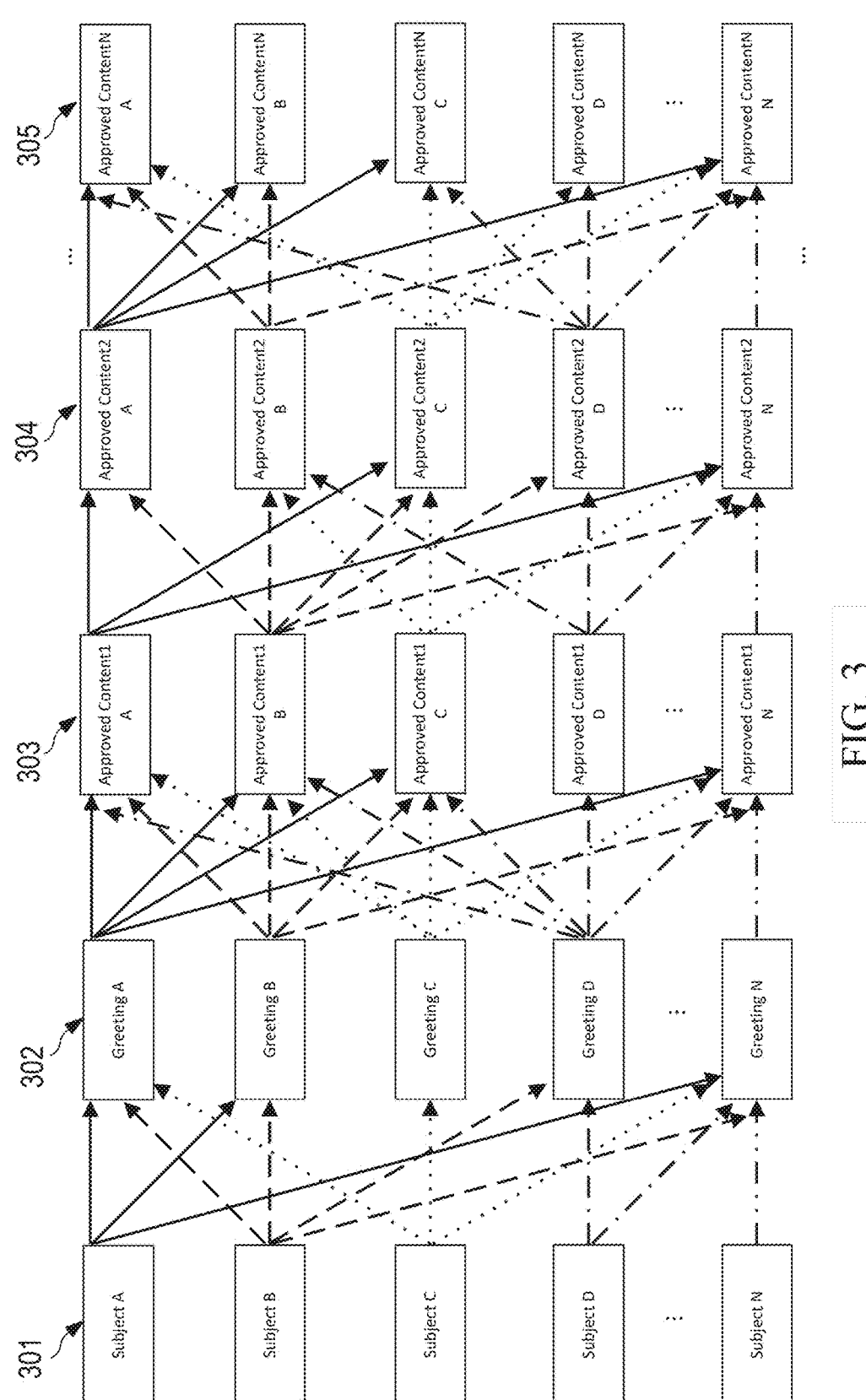
FIG. 3 illustrates an exemplary rules-based conditional flow diagram of building approved electronic communications according to one embodiment of the present invention.

FIG. 3 illustrates an exemplary rules-based conditional flow diagram of building approved electronic communications according to one embodiment of the present invention. Various approved blocks of text, fragments and/or attachments may be used to build the enhanced approved electronic communication. In one implementation, the multiprocessing engine 108 determines a Subject 301, Greeting 302, Approved Content 1 303, Approved Content 2 304 and Approved Content N 305 to compose an approved electronic communication. The multiprocessing engine 108 may utilize conditional rules logic to determine which approved blocks of text, fragments and/or attachments may be used to build the enhanced approved electronic communication. For instance, if Subject A is selected, only Greeting A, B and N may be viable options for building the enhanced approved electronic communication. The other Greetings C and D may be grayed out, disabled, or omitted from the user interface depicted in FIG. 4, as will be described in further detail below. Subsequently, if Greeting A is selected, Approved Content 1 A, Approved Content 1 B, Approved Content 1 C, and Approved Content 1 N may be viable options for building the enhanced approved electronic communication based on the rules-based conditional logic. The viable options for Approved Content 1 may be further limited depending on which Greeting is selected. The multiprocessing engine 108 may utilize the rules-based conditional flow diagram to further determine if Subject A, Greeting A and Approved Content 1 A is selected, only Approved Content 2 A, Approved Content 2 C, Approved Content 2 N may be the only available options, while the other available Approved Content 2 options may be grayed out, disabled, or omitted.

In another implementation, Subject B may be selected. The multiprocessing engine 108 may utilize conditional rules logic to determine Greeting A, Greeting B, Greeting D, and Greeting N are viable options. Greeting C and other Greeting options may be grayed out, disabled or omitted. Subsequently, if Subject B and Greeting N are selected, the multiprocessing engine 108 may determine only Approved Content 1 N is a viable option for building the enhanced approved electronic communication based on the rules-based conditional logic. Similarly, the multiprocessing engine 108 may determine if Approved Content 1 N is selected, only Approved Content 2 N is a viable option based on the rules-based conditional logic.

Figure 4:
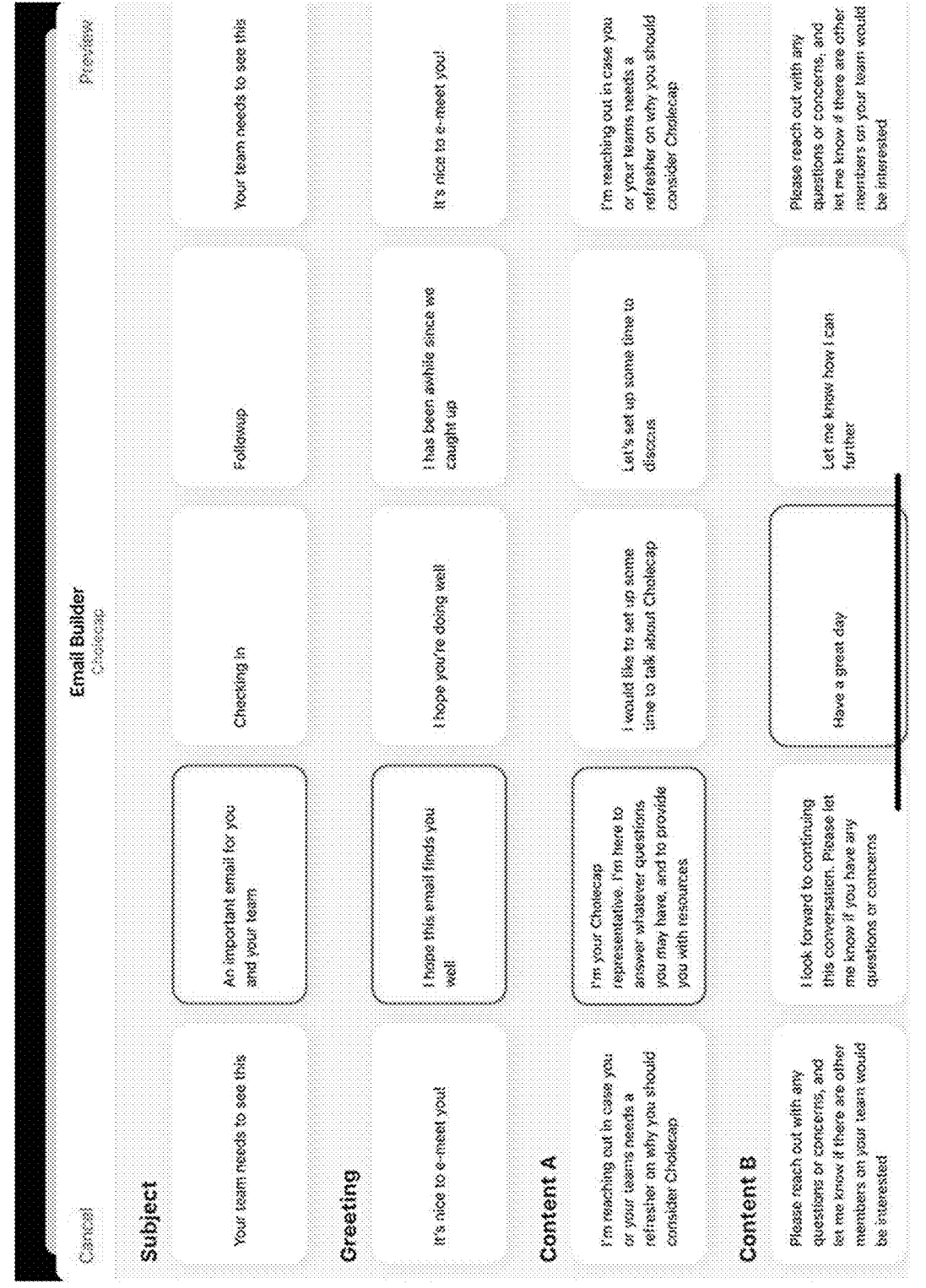
FIG. 4 illustrates an exemplary user interface for generating the rules-based conditional approved electronic communications according to one embodiment of the present invention.

FIG. 4 illustrates an exemplary user interface in a web-based or mobile interface within a web-based system 110 or mobile system 112 (see FIG. 1). As shown, the multiprocessing engine 108 may display various approved blocks of text, fragments and/or attachments available for building the enhanced approved electronic communication. Various options for a subject, greeting, Content A and Content B may be displayed. A subject, greeting, Content A and Content B may be selected. The multichannel processing engine 108 confirms that the approved content and form of email may permissibly be sent by the prospective email sender to the customers or other selected recipients based on factors including but not limited to regulatory limitations, customer preferences, demographic information, or the "opt-in" or "opt-out" status of individual customer accounts. Once that has been confirmed in accordance with the access protocol, the multichannel processing engine 108 can begin building and sending the emails in accordance with the user's selections or as modified in accordance with the access protocol, regulator engine, and or other system controls. The content contained within the enhanced approved email may be checked for accuracy and validity by the system before release to the email server 114. If the email is created when the user is offline, the content contained in the approved emails may be checked again after the user is back online, before they are sent to the email server.

To facilitate the compliance with government regulation, a regulatory compliance engine can be provided to review content and the access protocols and to ensure that only approved content authored by properly authorized individuals and according to required controls can be distributed to permitted possible customers and other content recipients in accordance with government regulations.

Figure 5:
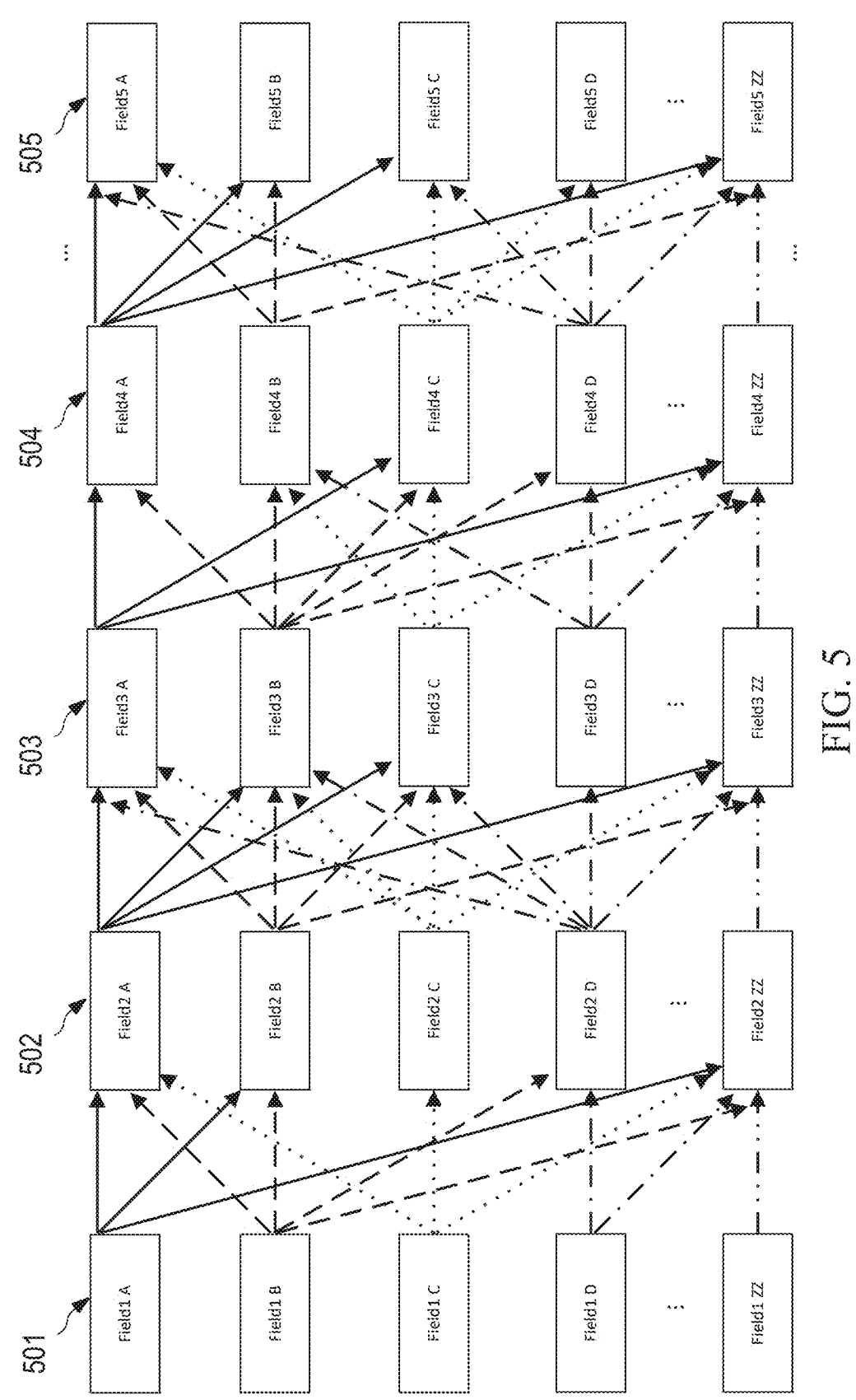
FIG. 5 illustrates an exemplary rules-based conditional flow diagram of building approved electronic communications content according to one embodiment of the present invention.

FIG. 5 illustrates an exemplary rules-based conditional flow diagram of building approved electronic communications content according to one embodiment of the present invention. In one implementation, the multiprocessing engine 108 determines a Field1 501, Field2 502, Field3 503, Field4 504 and Field5 505 to compose an approved electronic communication. The multiprocessing engine 108 may utilize conditional rules logic to determine which approved blocks of text, fragments and/or attachments may be used to build the enhanced approved electronic communication. For instance, if Field1 A is selected, only Field2 A, B and ZZ may be viable options for building the enhanced approved electronic communication. The other Field2 options, including C and D may be grayed out, disabled, or omitted from the user interface. If Field2 A is selected, Field3 A, Field3 B, Field3 C, and Field3 ZZ may be viable options for building the enhanced approved electronic communication based on the rules-based conditional logic. The viable options for Field3 may be further limited depending on which Field2 is selected. The multiprocessing engine 108 may utilize the rules-based conditional flow diagram to further determine if Field1 A, Field2 A and Field3 A is selected, only Field4 A, Field4 C, Field4 ZZ may be the only available options, while the other Field4 options may be grayed out, disabled, or omitted.

In another implementation, Field1 B may be selected. The multiprocessing engine 108 may utilize conditional rules logic to determine Field2 A, Field2 B, Field2 D, and Field2

ZZ are viable options. Field2 C and other Field2 options may be grayed out, disabled or omitted. Subsequently, if Field1 B and Field2 ZZ are selected, the multiprocessing engine 108 may determine only Field3 ZZ is a viable option for building the enhanced approved electronic communication based on the rules-based conditional logic. Similarly, the multiprocessing engine 108 may determine if Field3 ZZ is selected, only Field4 ZZ is a viable option based on the rules-based conditional logic.

Figure 6:
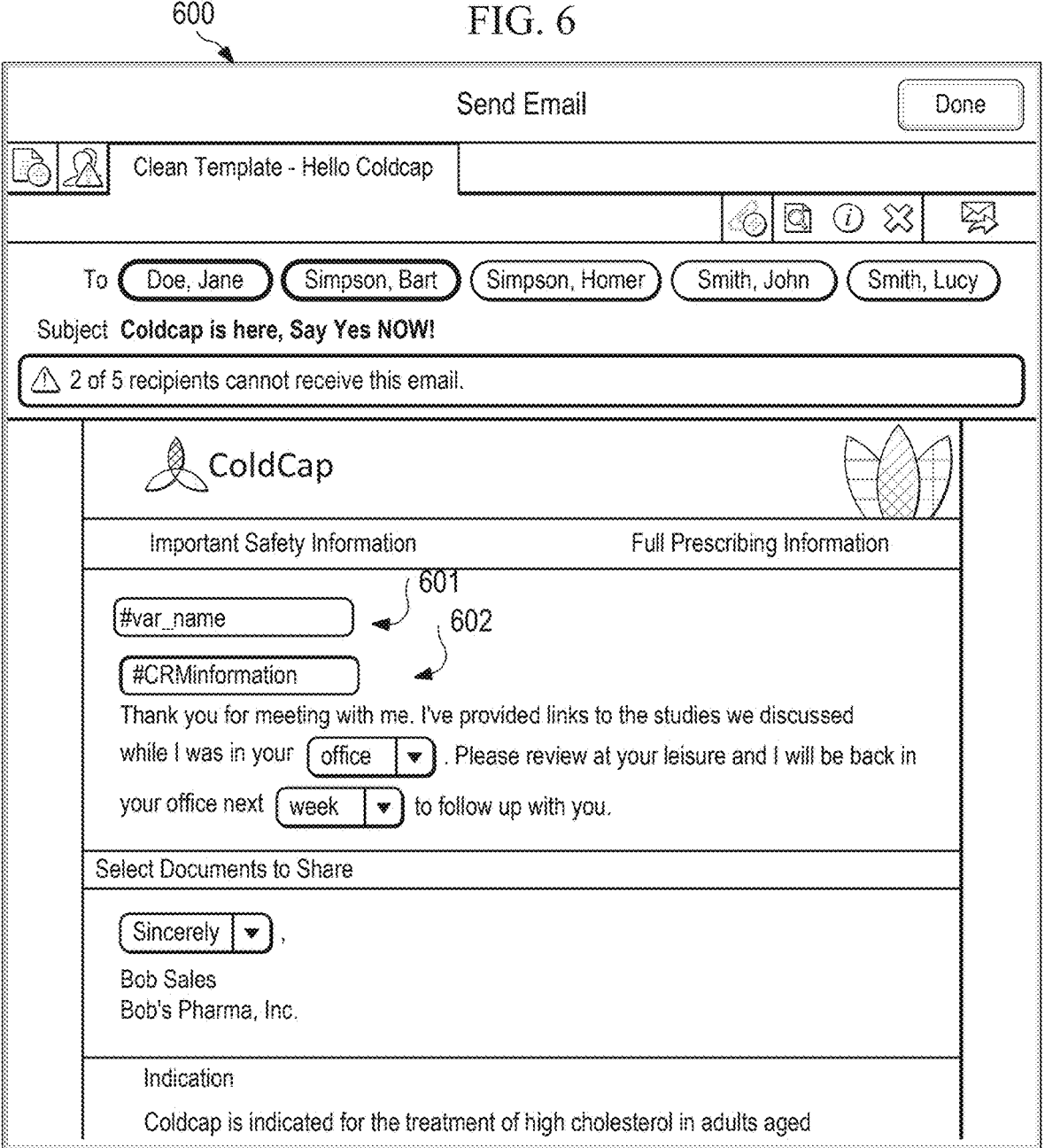
FIG. 6 illustrates a screenshot of an example approved email template for email generation with various conditional fields according to one embodiment of the present invention.

FIG. 6 depicts a screenshot of an example approved template 600 for enhanced email content generation according to one embodiment of the present embodiment. In one implementation, a user (e.g., pharmaceutical rep) may send a document to the recipient (e.g., HCP) that contains information that is personalized to the recipient or recipient's organization. For example, a user may need to send documents containing healthcare economics or formulary information specific to the HCP or HCO. Various information stored in CRM 104 may be used to build the enhanced approved electronic communication content. The template 600 may include one or more well-named tokens that CRM 104 will resolve to the appropriate value in the personalized copy. For instance, as shown there is a name field 601, and other relevant CRM data field 602. When the template is finalized, the multiprocessing engine 108 may query the CRM 104 for the well-named tokens 601 and 602 for the values and place them in the template 600.

The marketing and sales application 216 application provides an end-to-end solution for the development, approval, distribution, expiration and withdrawal of promotional materials related to regulatory restricted products (e.g., prescription drugs). Specific features include Support for global pieces, approved Form FDA (Food and Drug Administration) 2253 (or similar international forms) form generation, online document, and video annotation, and a built-in digital asset library (DAL). Again, the communications may be through the controlled content repository 102. In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 Code of Federal Regulations (CFR) Part 11, Annex 11 and Good Practice (GxP)-related requirements. The regulatory compliance engine 222 may include processors for developing metadata surrounding document and project folder accesses so from a regulatory compliance standpoint it can be assured that only allowed accesses to have been permitted. The regulatory compliance engine 122 may further includes pre-validation functionality to build controlled content in support of installation qualification (IQ) and/or operational qualification (OQ), resulting in significant savings to customers for their system validation costs.

Figure 7:
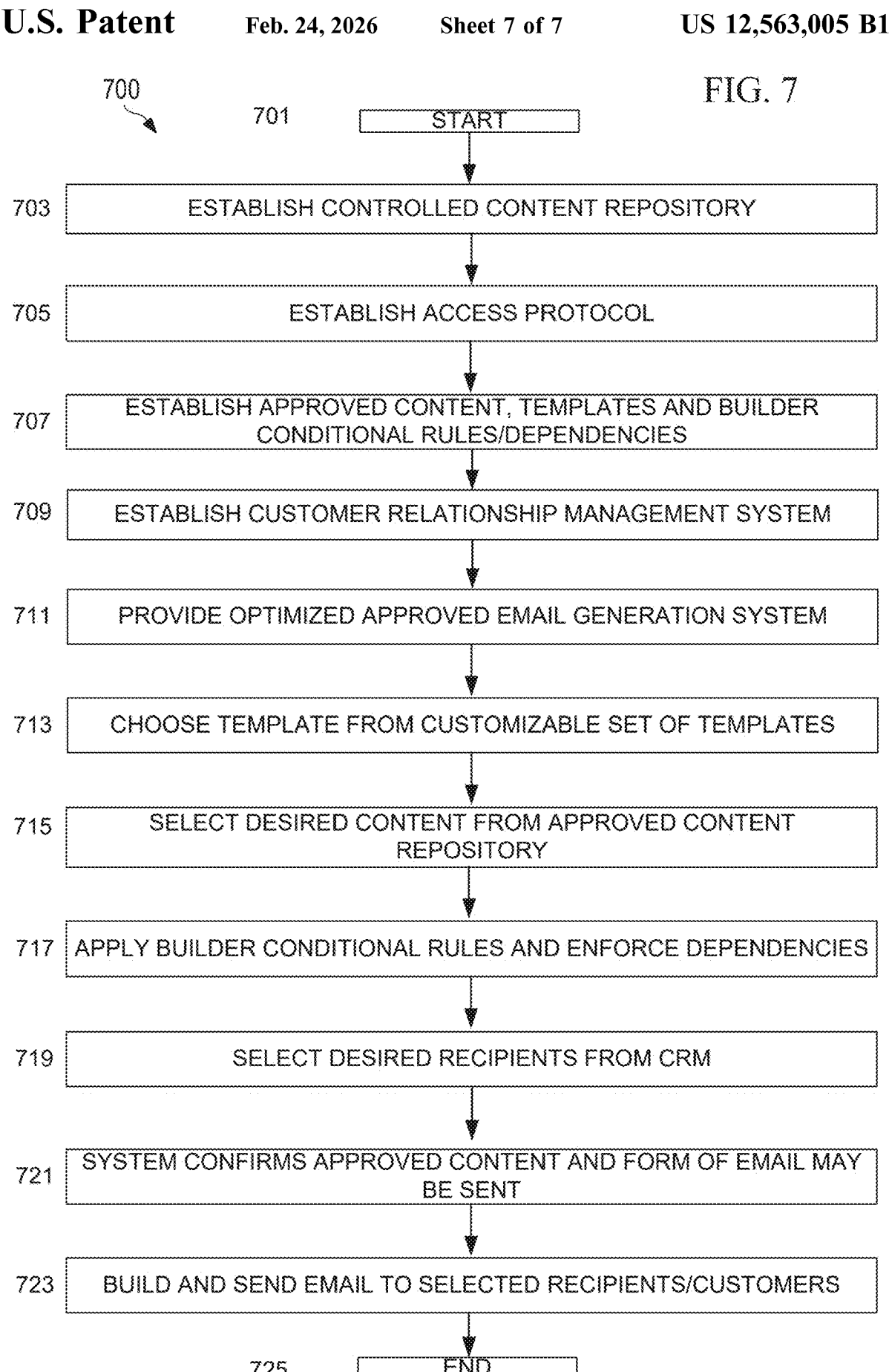
FIG. 7 illustrates an exemplary flowchart for the building and sending of approved emails according to one embodiment of the present invention.

FIG. 7 illustrates an exemplary flowchart for the optimized building and sending of approved emails according to one embodiment of the present invention. The method begins at 701.

At 703, the controlled email communication system 100 establishes a controlled content repository 102. As described herein, the controlled content repository is designed to be securely and controllably accessed such that only authorized users can build the controlled content therein. To ensure the integrity and security of the controlled content repository 102, an access protocol is established at step 705. The access protocol may be defined by computer instructions stored in the computer readable memory or executable code storage 120. By computer instructions stored therein, the multichannel processing engine 108 is thereby able to control access to the controlled content repository 102 in accordance with the principles described in the present application.

At 707, the controlled email communication system 100 establishes approved content to be stored in the controlled content repository 102 under the control of the access protocol established in step 705. Email templates that approved content senders can pick and choose from in building approved email content messages may also be established. Similarly, the exemplary rules-based conditional flow diagram of building approved electronic communications, as described in relation to FIG. 3, may be established.

At 709, the controlled email communication system 100 establishes a customer relationship management system 104. The customer relationship management system is accessed such that approved emails can be addressed to customer contacts of the enterprise or salesperson for the enterprise who is engaging in the marketing, manufacturing, clinical trials, or other activity described herein.

At 711, the controlled email communication system 100 provides an optimized approved email generation system. The actual email generation system is provided that interfaces with the approved content, the access protocol, the email templates, and/or the customer relationship management system. This email generation system, or more specifically, the multichannel processing engine 108, is accessed by senders of approved email content as described in the present application. In one implementation, the exemplary user interface for generating the rules-based conditional approved electronic communications, as depicted in FIG. 4, may be displayed.

At 713, the multichannel processing engine 108 determines an email template from a set of customizable templates. In this way the email authors or prospective senders do not have to recreate content every time an email campaign is beginning.

At 715, the multichannel processing engine 108 may determine the desired content from the approved content repository 102.

At 717, the multichannel processing engine 108 may apply builder conditional rules and enforce dependencies. In one implementation, the exemplary rules-based conditional flow diagram of building approved electronic communications depicted in FIG. 3 may be applied. Further, the optimized approved electronic communication user interface depicted in FIG. 4 may be used for application of the rules depicted in FIG. 3. Various approved blocks of text, fragments and/or attachments available from the controlled content repository 102 for building the enhanced approved electronic communication may be presented on availability to the user or customer based on their enterprise and/or configured template selected in 713.

At 719, the multichannel processing engine 108 may determine the desired recipients or customers from the CRM database 104. The multichannel processing engine 108 confirms that the approved content and form of email may permissibly be sent by the prospective email sender to the customers or other selected recipients at 721 based on factors including but not limited to regulatory limitations, customer preferences, demographic information, or the "opt-in" or "opt-out" status of individual customer accounts. Once that has been confirmed in accordance with the access protocol, the multichannel processing engine 108 can begin building and sending the emails in accordance with the user's selections or as modified in accordance with the access protocol, regulatory engine, and or other system controls, at 723. The content contained within the approved email may be checked for accuracy and validity by the system before release to the email server 114. If the email is created when the user is offline, the content contained in the approved emails may be checked again after the user is back online, before they are sent to the email server. The method ends at 725.

The flowcharts do not mean to limit the sequence of the steps. In one example, the controlled content repository 102 may determine in advance, before a template is determined at 713, if a piece of content can be sent to a customer and store the result. The result may be stored as a part of metadata for the content in the controlled content repository 102. During the generation of the approved email, the multichannel processing engine may check in the controlled content repository 102, instead of the customer relationship management subsystem 104, to decide if a piece of content can be sent to a customer.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, although the embodiments are described with a customer relationship management subsystem 104, the customer information and content may be from other types of information management systems, e.g., a Closed Loop Marketing (CLM) system. In addition, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

The approved content may be in any format, e.g., text, audio, video, picture, multimedia, or portable document format (PDF).

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/ modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FP-GAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a digital versatile disc (DVD) or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a compact disc read-only memory (CD-ROM), any other optical medium, punch cards, paper tape, any other physical medium with patterns of holes, a random-access memory (RAM), a programmable read-only memory (PROM), and erasable programmable read-only memory (EPROM), a flash memory (e.g., electronically erasable programmable read-only memory (EEPROM)), any other memory chip or cartridge, or any other medium on which instructions which can be executed by a processor are stored. The computer readable media does not include carrier waves and electronic signals passing wirelessly or over wired connections.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for optimized generation of approved electronic messages, the computer-implemented method comprising:

establishing an electronic message template, wherein the electronic message template includes at least a set of customized fields for electronic message personalization, a first item of approved content within a controlled content repository and a second item of approved content within the controlled content repository;

establishing an access protocol for the controlled content repository, whereby approved content is stored in the controlled content repository and is accessible according to the access protocol, and whereby the access protocol comprises at least one set of alignment rules for determining that the first item of approved content within the controlled content repository and the second item of approved content within the controlled content repository will be made available to a first customer via an electronic message;

establishing at least one set of electronic message builder conditional rules, whereby the first item of approved content within the controlled content repository, the second item of approved content within the controlled content repository, and the set of customized fields for electronic message personalization are dependent on each other and conditionally available to the first customer via the electronic message template;

aligning the approved content within the controlled content repository with information from an information management system;

providing the first item of approved content within the controlled content repository for selection by a sender after a determination that the first item of approved content within the controlled content repository is authorized to be made available to the first customer in accordance with the at least one set of alignment rules, and the at least one set of electronic message builder conditional rules;

providing the second item of approved content within the controlled content repository for selection by the sender after a determination that the second item of approved content within the controlled content repository is authorized to be made available to the first customer in accordance with the at least one set of alignment rules, and the at least one set of electronic message builder conditional rules; and enabling generation of the electronic message for sending the provided first item of approved content within the controlled content repository and the provided second item of approved content within the controlled content repository to the first customer.

2. The computer-implemented method of claim 1 above, wherein the set of customized fields for electronic message personalization includes at least one of the following: subject, greeting, or personal anecdotal information.

3. The computer-implemented method of claim 1 above, wherein the first item of approved content within the controlled content repository is a block of approved text.

4. The computer-implemented method of claim 1 above, wherein the first item of approved content within the controlled content repository is an approved attachment.

5. The computer-implemented method of claim 1 above, wherein the first item of approved content includes a document containing healthcare economics.

6. The computer-implemented method of claim 1 above, wherein the first item of approved content includes a document containing formulary information specific to a recipient.

7. The computer-implemented method of claim 1 above, wherein the first item of approved content within the controlled content repository and the second item of approved content within the controlled content repository are both selected from one of the following: a block of approved text, or an approved attachment.

8. The computer-implemented method of claim 1 above, wherein the information management system is a customer relationship management (CRM) system or a closed loop marketing (CLM) system.

9. The computer-implemented method of claim 1 above, wherein the information from the information management system comprises information related to a customer profile, customer preferences or regulatory limitations.

10. The computer-implemented method of claim 1 above, wherein the electronic message template is pre-generated with approved content and has at least one customizable area.

11. The computer-implemented method of claim 1, further comprising: providing a hyperlink to the first item of approved content and including the hyperlink in the electronic message.

12. The computer-implemented method of claim 1, further comprising: providing a hyperlink to the second item of approved content and including the hyperlink in the electronic message.

13. The computer-implemented method of claim 1, wherein when the first item of approved content is updated after the electronic message is generated, the first customer is automatically directed to the updated version of the first item of approved content.

14. The computer-implemented method of claim 1, further comprising: determining a domain the electronic message is delivered through.

15. The computer-implemented method of claim 1, further comprising:

verifying content in the electronic message just before is released to a server used for sending the electronic message.

16. The computer-implemented method of claim 1, wherein the access protocol is based on regulatory restrictions.

17. The computer-implemented method of claim 1, wherein the access protocol is based on customer profile information.

18. The computer-implemented method of claim 1, wherein the controlled content repository is adapted to provide development and distribution of promotional materials as related to regulatory restricted products.

19. The computer-implemented method of claim 18, wherein the regulatory restricted products are prescription drugs.

\*    \*    \*    \*    \*